United States Patent
Baughman et al.

(10) Patent No.: US 10,796,241 B2
(45) Date of Patent: Oct. 6, 2020

(54) FORECASTABLE SUPERVISED LABELS AND CORPUS SETS FOR TRAINING A NATURAL-LANGUAGE PROCESSING SYSTEM

(71) Applicant: International Business Machines Corporation, Armonk, NY (US)

(72) Inventors: Aaron K. Baughman, Silver Spring, MD (US); Gary F. Diamanti, Wake Forest, NC (US); Mauro Marzorati, Lutz, FL (US)

(73) Assignee: International Business Machines Corporation, Armonk, NY (US)

( * ) Notice: Subject to any disclaimer, the term of this patent is extended or adjusted under 35 U.S.C. 154(b) by 1201 days.

(21) Appl. No.: 14/927,766

(22) Filed: Oct. 30, 2015

(65) Prior Publication Data

US 2017/0124479 A1    May 4, 2017

(51) Int. Cl.
*G06N 20/00* (2019.01)
*G06N 5/04* (2006.01)
(Continued)

(52) U.S. Cl.
CPC ............ *G06N 20/00* (2019.01); *G06F 40/30* (2020.01); *G06F 40/42* (2020.01); *G06N 5/04* (2013.01)

(58) Field of Classification Search
CPC ...... G06N 20/00; G06N 5/04; G06F 17/2785; G06F 17/2809
See application file for complete search history.

(56) References Cited

U.S. PATENT DOCUMENTS

| 9,390,112 | B1  | 7/2016 | Daly |            |
|-----------|-----|--------|------|------------|
| 2003/0135445 | A1* | 7/2003 | Herz | G06Q 40/04 |
|           |     |        |      | 705/37     |

(Continued)

FOREIGN PATENT DOCUMENTS

WO    WO2012141332    10/2012

OTHER PUBLICATIONS

U.S. Appl. No. 15/014,085, filed Feb. 3, 2016, Conf .No. 3445.
Kilgarriff, Adam, and Gregory Grefenstette. "Web as corpus." Proceedings of Corpus Linguistics 2001. Corpus Linguistics. Readings in a Widening Discipline, 2001. (Year: 2001).

(Continued)

*Primary Examiner* — Kamran Afshar
*Assistant Examiner* — Ryan C Vaughn
(74) *Attorney, Agent, or Firm* — Schmeiser, Olsen & Watts; Michael A. Petrocelli

(57) ABSTRACT

A method and associated systems for forecastable supervised labels and corpus sets for training a natural-language processing system. An NLP-training system asks an "oracle" expert to answer a predictive test question and, in response, receives from the oracle an answer, rationales for selecting that answer, and identifications of extrinsic natural-language sources of evidence that supports those rationales. The system retrieves updated versions of that evidence at a later time, and returns that updated evidence to the oracle. In response, the oracle returns an updated answer and rationales based on the updated evidence. The system then compares time-varying characteristics of the evidence in order to determine the relative contributions of each piece of evidence to the oracles' selections. Less relevant evidence is discarded and the remaining, optimized, evidence is forwarded to the NLP system to be used as training data.

19 Claims, 2 Drawing Sheets

(51) Int. Cl.
*G06F 40/30* (2020.01)
*G06F 40/42* (2020.01)

(56) References Cited

U.S. PATENT DOCUMENTS

| | | | |
|---|---|---|---|
| 2009/0087822 A1 | 4/2009 | Stanton | |
| 2014/0019399 A1* | 1/2014 | Busch | G06F 17/27 706/46 |
| 2014/0280253 A1* | 9/2014 | Clark | G06F 16/3344 707/755 |
| 2015/0026163 A1* | 1/2015 | Haggar | G06F 16/3329 707/723 |
| 2015/0193682 A1* | 7/2015 | Baughman | G06F 16/243 707/728 |
| 2015/0293917 A1* | 10/2015 | Bufe, III | G06F 16/24578 706/12 |
| 2016/0012122 A1 | 1/2016 | Franceschini | |
| 2016/0110459 A1* | 4/2016 | Jamrog | G06F 16/3329 707/723 |
| 2016/0239740 A1* | 8/2016 | Baughman | G06N 20/00 |
| 2017/0004204 A1* | 1/2017 | Bastide | G06F 16/3329 |
| 2017/0011026 A1* | 1/2017 | Byron | G06F 17/2785 |
| 2017/0169017 A1 | 6/2017 | Byron | |

OTHER PUBLICATIONS

Labriola, Donald J.; List of IBM Patents or Patent Applications Treated as Related; May 16, 2019; 1 page.

worldofcomputing .net. https :1/web.archive .org/web/20 150314195201 /http ://language .worldofcomputing .net/linguistics/introduction/ what-is-corpus.html. WayBackMachine archive from Mar. 14, 2015. Accessed Mar. 12, 2019. (Year: 2015).

Meng et al., Synthesizing English emphatic speech for multimodal corrective feedback in computer-aided pronunciation training, Multimed Tools Appl (2014) 73:463-489, DOI 10.1007/s11042-013-1601-y, published Aug. 3, 2013, 27 pages.

Liang et al., Empirical Study of Bagging Predictors on Medical Data, The Centre for Quantum Computation & Intelligent Systems, FEIT, University of Technology, Sydney NSW 2007 Australia, 2011, 10 pages.

Rudin et al., Learning Theory Analysis for Association Rules and Sequential Event Prediction, Journal of Machine Learning Research 14 (2013) 3441-3492, submitted Jun. 2011; revised Jul. 2013; published Nov. 2013, 2013, 52 pages.

Byungki Byun, On Discriminative Semi-Supervised Incremental Learning with a Multi-View Perspective for Image Concept Modeling, Georgia Institute of Technology, May 2012, 151 pages.

\* cited by examiner

FORECASTABLE SUPERVISED LABELS AND CORPUS SETS FOR TRAINING A NATURAL-LANGUAGE PROCESSING SYSTEM

TECHNICAL FIELD

This invention relates to improving the functioning of a natural-language processing (NLP) cognitive system by optimizing information models used to train NLP systems and other types of artificially intelligent systems.

BACKGROUND

Training a natural-language processing system or other type of artificially intelligent system requires creating bodies of information from which the system may infer meanings and rules. This allows the system to then base its own decisions and predictions on those inferred meanings and rules.

Such bodies of information are only as reliable as their sources and in many cases, human sources are plagued by biases, context-dependent perceptual distortions, and personal sensitivities that reduce confidence that the information they provide is consistent or correct. These problems are even more pronounced when training systems to solve problems that require an ability to correctly answer predictive questions.

There is no method or system in the current state of the art of natural-language processing that can effectively and automatically ensure that knowledge culled from human sources is correct and consistent enough to be used to efficiently train a natural-language processing system.

BRIEF SUMMARY

A first embodiment of the present invention provides an NLP-training system comprising a processor, a memory coupled to the processor, and a computer-readable hardware storage device coupled to the processor, the storage device containing program code configured to be run by the processor via the memory to implement a method for forecastable supervised labels and corpus sets for training a natural-language processing system, the method comprising:

the training system selecting an oracle, wherein an oracle is a human or computerized expert in a particular field of endeavor;

the training system receiving from the oracle a first label and a first set of rationales, wherein the oracle selected the first label and the first set of rationales at a first time as a function of natural-language content stored at one or more extrinsic electronic sources, wherein the first label identifies a correct answer to a predictive question, wherein the first set of rationales identifies one or more reasons why the oracle selected the first label, and wherein answering the predictive question comprises predicting a future occurrence;

the training system adding the natural-language content to a first set of corpora;

the training system retrieving from the one or more extrinsic electronic sources, at a second time, a later version of the natural-language content;

the training system creating a second set of corpora by adding to the first set of corpora the later version of the natural-language content;

the training system communicating the second set of corpora to the oracle;

the training system accepting from the oracle, in response to the communicating, a second label and a second set of rationales; and the training system eliminating less relevant datasets from the second set of corpora as a function of the relative relevance of each dataset of the second set of corpora to the oracle's selection of the second label and the second set of rationales.

A second embodiment of the present invention provides a method for forecastable supervised labels and corpus sets for training a natural-language processing system, the method comprising:

an NLP-training system selecting an oracle, wherein an oracle is a human or computerized expert in a particular field of endeavor;

the training system receiving from the oracle a first label and a first set of rationales, wherein the oracle selected the first label and the first set of rationales at a first time as a function of natural-language content stored at one or more extrinsic electronic sources, wherein the first label identifies a correct answer to a predictive question, wherein the first set of rationales identifies one or more reasons why the oracle selected the first label, and wherein answering the predictive question comprises predicting a future occurrence;

the training system adding the natural-language content to a first set of corpora;

the training system retrieving from the one or more extrinsic electronic sources, at a second time, a later version of the natural-language content;

the training system creating a second set of corpora by adding to the first set of corpora the later version of the natural-language content;

the training system communicating the second set of corpora to the oracle;

the training system accepting from the oracle, in response to the communicating, a second label and a second set of rationales; and the training system eliminating less relevant datasets from the second set of corpora as a function of the relative relevance of each dataset of the second set of corpora to the oracle's selection of the second label and the second set of rationales.

A third embodiment of the present invention provides a computer program product, comprising a computer-readable hardware storage device having a computer-readable program code stored therein, the program code configured to be executed by an NLP-training system comprising a processor, a memory coupled to the processor, and a computer-readable hardware storage device coupled to the processor, the storage device containing program code configured to be run by the processor via the memory to implement a method for forecastable supervised labels and corpus sets for training a natural-language processing system, the method comprising:

the training system selecting an oracle, wherein an oracle is a human or computerized expert in a particular field of endeavor;

the training system receiving from the oracle a first label and a first set of rationales, wherein the oracle selected the first label and the first set of rationales at a first time as a function of natural-language content stored at one or more extrinsic electronic sources, wherein the first label identifies a correct answer to a predictive question, wherein the first set of rationales identifies one or more reasons why the oracle selected the first label, and wherein answering the predictive question comprises predicting a future occurrence;

the training system adding the natural-language content to a first set of corpora, wherein a first corpus of the first set of corpora comprises a first set of datasets of a plurality of sets of datasets, and wherein every dataset of the first set of datasets comprises a subset of the natural-language content retrieved at the first time from a first source of the one or more extrinsic electronic sources;

the training system retrieving from the one or more extrinsic electronic sources, at a second time, a later version of the natural-language content;

the training system creating a second set of corpora by adding to the first set of corpora the later version of the natural-language content;

the training system communicating the second set of corpora to the oracle;

the training system accepting from the oracle, in response to the communicating, a second label and a second set of rationales; and the training system eliminating less relevant datasets from the second set of corpora as a function of the relative relevance of each dataset of the second set of corpora to the oracle's selection of the second label and the second set of rationales.

DETAILED DESCRIPTION

Figure 1:
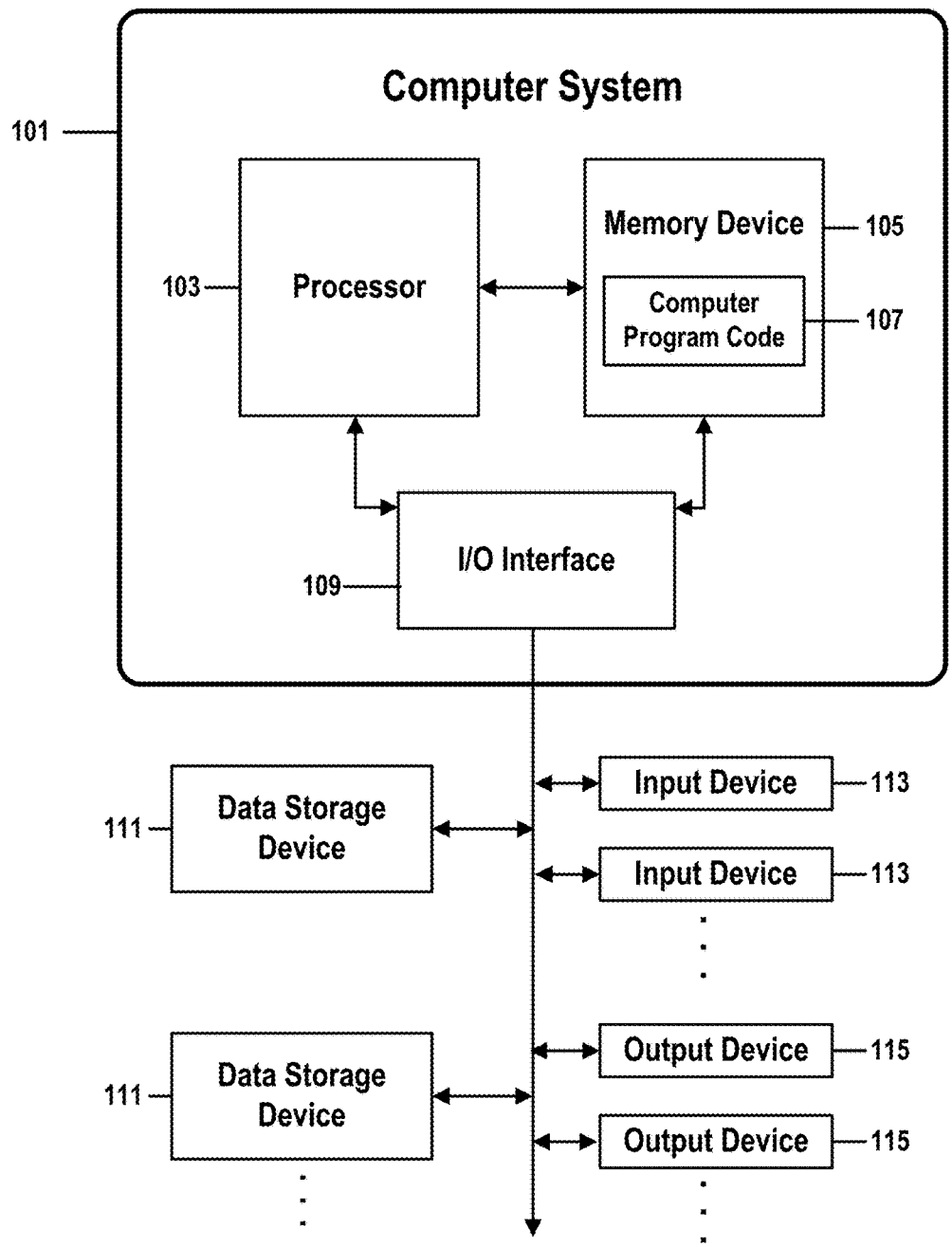
FIG. 1 shows a structure of a computer system and computer program code that may be used to implement a method for forecastable supervised labels and corpus sets for training a natural-language processing system in accordance with embodiments of the present invention.

Natural-language processing (NLP) systems, computer-assisted learning systems, and other types of artificially intelligent software must be trained in order to learn how to interact with users in a manner that simulates natural human interaction. These systems may be referred to as "cognitive" systems because, when properly trained, they simulate interactive behavior that mimics cognitive processes of human beings.

In particular, an NLP system may be trained to respond to natural-language human speech with its own natural-language responses. It may choose these responses by referring to information, examples, rules, relationships among data structures, and other information stored in a knowledgebase of information organized into an ontology.

An NLP system develops such a knowledgebase by learning how to infer rules and meanings from examples of how human experts interact with natural-language information. This natural-language information may be stored as sets of "corpora," each of which contains knowledge, represented as natural-language text, associated with a particular domain. When incorporated into an NLP system's internal knowledgebase or predictive model, such corpus sets may be organized into domain-specific topics. Embodiments and examples of the present invention described in this document, for example, develop and optimize a corpus set that contains information that may be used to train an NLP system to correctly answer a predictive question, such as "How many persons will likely vote in the next Presidential election in the State of Nevada?"

Here each "corpus" (the singular of the plural term "corpora") included within a set of corpora (or, alternatively, a "corpus set") contains one or more datasets. Within the context of the present invention, each dataset in turn contains time-stamped natural-language information that may be used as evidence to support a correct answer to the predictive question associated with the dataset's comprising corpora.

In the most general sense of the term, a corpus may comprise information culled from any natural-language library that contains time-stamped entries, such as an online encyclopedia, an article of an online encyclopedia, a magazine database, or a database of natural-language product reviews posted by buyers on a company's Web site. In such a general case, information included within such a corpus may be used as a source of evidence to support or refute any hypothesis, inference, or rationale that may be used to train a cognitive system.

In embodiments of the present invention, a set of corpora may be created or updated by the cognitive system in response to identification by one or more "oracles," each of which may comprise one or more natural-language sources of evidence. An oracle, as the term is used here, is an expert individual or a group of one or more experts who share a two-dimensional social hyperplane. That is, members of a group oracle may share: i) a common social or demographic characteristic, such as a political affiliation, a location of residency, or an income level; and ii) a knowledge or skill, such as an engineering degree, an expertise in a craft, or work experience in a particular area.

In a supervised training session within the scope of the present invention, one or more processors of an NLP-training module of a cognitive system may ask the oracle a set of test questions selected from a larger catalog of questions. This larger catalog, or the selected set, may have been identified by the one or more processors as a function of either or both of the commonalties shared by individuals in the oracle. In other words, if an oracle's area of expertise is in the field of sporting goods, the processors may ask the oracle questions about tennis rackets and may associate the oracle with one or more sets of corpora that are associated with a domain related to racquet sports.

In some embodiments, an oracle may be a hardware or software-based expert system that uses methods of artificial intelligence to mimic cognitive behavior of a human expert. In such embodiments, the expert system may produce different results than would a human expert due to fundamental differences between human experts and computerized expert systems. In embodiments that do comprise oracles that are all or in part computerized entities, steps of the method of FIG. 2 that involve interaction between a training system and an oracle may be performed by wholly electronic means.

When the processors ask the oracle a test question in such a supervised interactive scenario, the oracle may identify what it believes is a correct answer and one or more rationales for selecting that answer. The oracle may also identify extrinsic natural-language sources of information that the oracle believes, based on the oracle's expert knowledge, provide evidence in support of the oracle's assertions.

In embodiments of the present invention, the one or more processors may import each of these natural-language sources into the set of corpora associated with the test question that the oracle has answered. Each source may be imported as one or more discrete "documents" that are all organized into a single dataset of a corpus associated with that source. This corpus may continue to accumulate other datasets culled from information retrieved at different times from this same source.

The oracle's answer is recorded as a "label" of the set of corpora and the oracle's label and rationales are then associated by the processors of the training system with this corpus set. This information, included within the corpus set, in addition to other logical and informational elements of the corpus set may then be used to train the cognitive system by example.

Embodiments of the present invention add further novel steps to this procedure by using "lag variables" to optimize the set of corpora. Here, a lag variable is a means of identifying changes in information provided by the oracle's identified sources over time, and of inferring patterns in these changes that allow the system to associate each dataset of information retrieved from a source to be ranked by importance, relevance, "worth," or relative contribution to the rationales used by the oracle to support its selection of a correct answer.

Embodiments further optimize a training procedure of an NLP system by using these rankings to discard datasets that fail to achieve a threshold degree of importance, relevance, "worth," or relative contribution. In some cases, a large proportion of datasets may be discarded in this way, greatly reducing the size of the sets of corpora required to train a real-world cognitive system. In this way, embodiments of the present invention improve the efficiency and operation of, and may even make possible an implementation of, cognitive systems and training systems that would otherwise be difficult or impossible to deploy because of the immense size and resource requirements of an unabridged set of corpora.

In one example, an oracle may comprise individuals that: i) live in the Northeast United States; and ii) possess documented outdoor-gardening skills. In a formal, supervised training scenario, this oracle (and, perhaps, other oracles that comprise individuals from other 2D social hyperplanes) is asked to answer a test set of questions associated with a domain of "gardening" that includes the question "What will tomorrow's weather be like?"

In this example, the oracle's answers may yield a label "warm and clear," and two rationales: i) "there are no clouds in the sky tonight"; and ii) "this geographical area usually experiences warm weather at this time of year."

Each oracle's selection of label and rationales for a particular test question may be based at least in part on natural-language information obtained from one or more "subscribers" or extrinsic sources.

In our preceding example, an oracle may answer the weather-related test question, at least in part, based on information found on an Internet search engine or at an online weather Web site that lists average temperatures in the Northeast United States for each week of the year. The information made available by a subscriber may vary with time, as the subscriber updates its Web site, database, or other information source.

Labels and rationales identified by an oracle may be associated with one or more datasets. Each dataset comprises a set of natural-language knowledge or data associated with one label, one subscriber, and one particular time.

A corpus is a union of all datasets associated with a particular label and a particular subscriber, regardless of time. These unions of datasets may be combined into a set of corpora (or "corpus set") that is associated with one particular label, regardless of subscriber or time.

In our preceding example, the oracle may be asked, in a supervised scenario, to answer the weather-related test question three times within a twelve-hour period: in the afternoon, in the early evening, and late at night. In each case, the individuals that comprise the oracle refer to two subscribers in order to review natural-language information upon which they may base their answers: an Internet search engine and a weather-related Web site.

Each individual in the oracle will thus provide three answers to the weather-related test question, one in each of the three supervised scenarios. In each scenario, the answers submitted by each individual's vote will result in a single label. Each of these three labels will be associated with the time at which the question was asked, and will be further associated with the two "subscriber" sources.

This will result in six datasets. Each of those datasets will comprise a natural-language library of time-stamped entries associated with one of the three labels and one of the two subscribers. One dataset might, for example, comprise natural-language search results or comments returned by the search engine during the first, afternoon, supervised scenario. An other dataset might comprise natural-language weather information as it appeared on the weather Web site at the time of the third, late-night scenario.

These six datasets will be combined into two corpora, each of which comprises all datasets associated with a label of a test question and a particular subscriber. A first corpus of the two could, for example, comprise the three datasets that comprise natural-language weather information as it appeared on the weather Web site during each of the three supervised scenarios. The second corpus of the two would then comprise the three datasets that comprise natural-language search-engine results retrieved during each of the three supervised scenarios.

Finally, this first corpus and second corpus would be combined into a corpus set associated with the label, containing all natural-language information, regardless of time stamp or source, associated with the label selected by the oracle for its test question.

In some embodiments of the present invention, a corpus may be created in this manner for each oracle and each test question. In other embodiments, a single corpus may be created for each test question, including information associated with every oracle to which the test question was posed.

In some embodiments, each supervised scenario may result in a different label being assigned to a test question. In our ongoing example, the oracle may vote to answer the weather-related question with the label "partly cloudy" in the afternoon session, because subscriber information indicated at that time that clouds would be moving in. In the early evening scenario, however, the oracle may instead select the label "partly sunny," based on updated subscriber information that indicated a probability that clouds would mostly disperse before morning.

In embodiments of the present invention, the supervised training scenarios and test questions are configured to allow each oracle to produce predictive labels that satisfy a required level of confidence. This means that the oracles are not merely asked to make logical associations among known entities based on expert knowledge ("if water boils at 212 degrees and the temperature of a vial of water is 80 degrees, the water in that vial cannot be boiling"), but are instead asked to infer relationships among distinct extrinsic natural-language sources and to make predictions—like a weather forecast based on observable present conditions—based on those inferences.

FIG. 1 shows a structure of a computer system and computer program code that may be used to implement a method for forecastable supervised labels and corpus sets for training a natural-language processing system in accordance with embodiments of the present invention. FIG. 1 refers to objects 101-115.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for forecastable supervised labels and corpus sets for training a natural-language processing system in accordance with embodiments of the present invention, and may implement other embodiments described in this specification, including the methods illustrated in FIGS. 1-2. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for forecastable supervised labels and corpus sets for training a natural-language processing system.

Any of the components of the present invention could be created, integrated, hosted, maintained, deployed, managed, serviced, supported, etc. by a service provider who offers to facilitate a method for forecastable supervised labels and corpus sets for training a natural-language processing system. Thus the present invention discloses a process for deploying or integrating computing infrastructure, comprising integrating computer-readable code into the computer system 101, wherein the code in combination with the computer system 101 is capable of performing a method for forecastable supervised labels and corpus sets for training a natural-language processing system.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for forecastable supervised labels and corpus sets for training a natural-language processing system may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 data is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
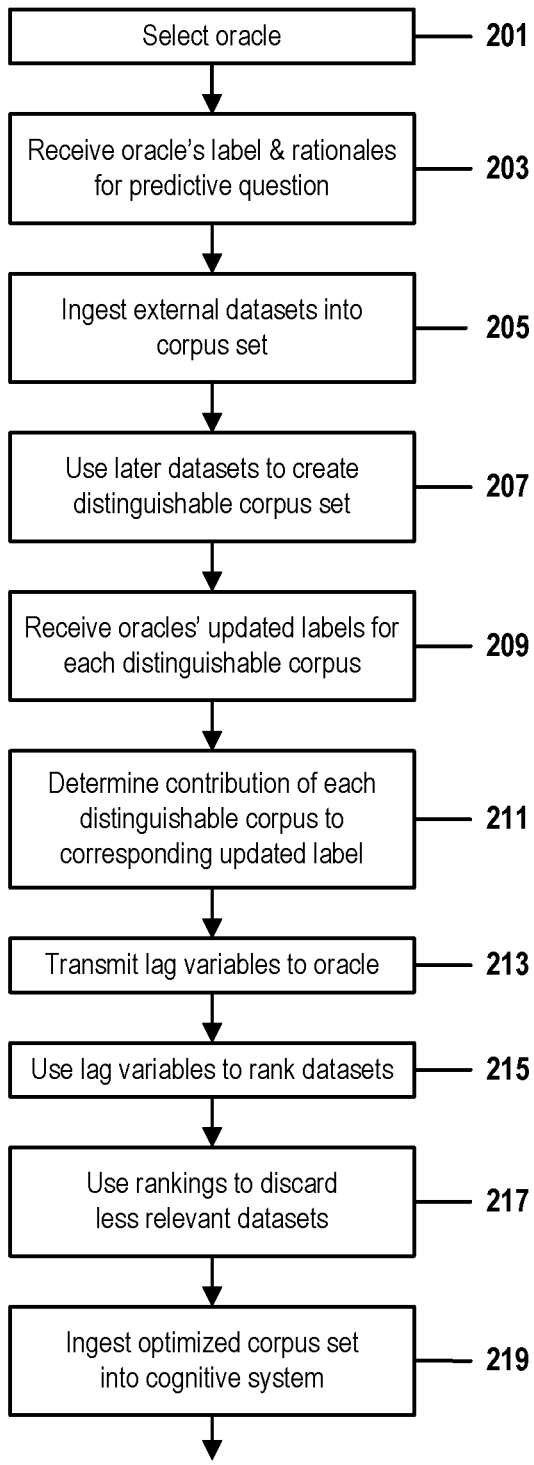
FIG. 2 is a flow chart that illustrates steps of a method for F forecastable supervised labels and corpus sets for training a natural-language processing system in accordance with embodiments of the present invention.

FIG. 2 is a flow chart that illustrates steps of a method for forecastable supervised labels and corpus sets for training a natural-language processing system in accordance with embodiments of the present invention. FIG. 2 contains steps 201-219, which may be performed by embodiments that incorporate the data structures of FIG. 1.

In step 201, one or more processors of a computer system select one or more oracles qualified to train a predictive model of a natural-language processing (NLP) system. This training takes place in the form of one or more supervised training scenarios, in which the one or more processors asks the oracles to answer test questions. The processors may select the oracles by any means known in the art, such as selecting an oracle based on knowledge that the oracle is a known expert in a field or domain associated with the test question. In one example, if the processor intends to train a cognitive system with test questions related to weather conditions, the system might select oracles that have work experience at the National Oceanic and Atmospheric Administration or at the National Weather Service, or who have earned a degree in the field of Atmospheric Science.

Here, an NLP system is an application that translates natural human language into a form that may be processed by a computerized or electronic system. This translation may be performed by inferring semantic meanings to components of natural-language input. An NLP system may, for example, determine which words of a natural-language sentence represent a subject, an object, a predicate, and one or more conjunctions, and then use those determinations to identify likely meanings of each word or phrase, or of the sentence itself.

An NLP system may perform these translations by following sets of rules and by identifying known relationships among elements, or "tokens," of natural-language input. These rules and relationships may be stored in a complex data structure known as a knowledgebase, or may be organized according to a system known as an ontology.

In embodiments of the present invention, an NLP application may derive these rules and relationships by inferring knowledge from sets of corpora, where each corpus set comprises natural-language information that the NLP system may use to identify a label and rationale associated with a test question. By inferring meanings from these sets of corpora and from relationships among inferred meanings, the NLP may better determine how to interpret natural-language input from a user in a way likely to correctly identify the user's intended meaning.

As described above, in embodiments of the present invention, each set of corpora comprises time-stamped natural-language information culled from multiple "subscriber" sources (that, like a third-party Internet Web site, may be extrinsic to the embodiment). An NLP system may use this content to identify a likely label and rationales associated with one test question and may further use these identifications to more accurately interpret future natural-language input.

In embodiments of the present invention, the NLP system may further use this input to help the system more accurately answer predictive questions, such as the aforementioned test question: "What will tomorrow's weather be like?".

Each corpus of a corpus set is organized into a set of datasets. One corpus of the corpus set contains a subset of the time-stamped natural-language information that has been culled from one subscriber of the multiple subscribers. One dataset of a corpus contains a subset of that corpus's natural-language information that has been culled from one subscriber at one particular time.

Selecting and loading this information into sets of corpora so as to be most useful to an NLP or to an NLP-training system requires a means of choosing labels and rationales that are likely to be "correct"—that is, choosing labels and rationales that identify responses to test questions most likely to have predictive value.

Embodiments of this invention address this issue in step 201 by selecting oracles that have a likelihood of answering test questions in a supervised training scenario such that the system is able to use the oracles' answers to generate sets of corpora likely to identify correct labels and rationales.

In step 203, the one or more processors ask each of the selected oracles to answer one or more predictive test questions in a supervised scenario. In this context, a supervised scenario may comprise one or more interactive sessions in which the processors pose the predictive questions, optionally allowing the oracle to select an answer from a list. In response, the selected oracles communicate to the processor their selections of a correct answer, of rationales that support those selections, and extrinsic information sources that contain evidence supporting those rationales.

A predictive test question, as described above, is one that can only be answered by predicting a future occurrence or condition. Examples of predictive questions are: "Will the stock market rise tomorrow?", "How long will it take for this shipment to arrive?", and "At what time will the sun set one week from today?".

An oracle to whom such a question is posed may determine how to respond by referring to one or more extrinsic natural-language "subscriber" sources of information, such as Internet search engines, electronic encyclopedias, computerized magazine archives, manufacturer Web sites, or online databases. In particular, a subscriber may be an information aggregator or evidence provider from which may be extracted inferences probative of an oracle's rationales for selecting a label.

Each oracle in step 203 returns to the one or more processors a label and one or more rationales for each test question that the oracle has been asked. In some embodiments, each oracle may also identify the extrinsic sources of natural-language information that the oracle believes supports the oracle's choice of label and rationales.

In embodiments described in the examples accompanying FIG. 2, each oracle might identify sources from that may be ingested as datasets of a corpus set for a predictive test question that the one or more processors had presented to the oracle in step 203. Each such corpus set would thus comprise natural-language datasets comprising evidence used by the oracle to identify rationales for one of the labels selected by the oracle.

In step 205, the one or more processors incorporate the received labels, rationales, and natural-language information sources received in step 203 as datasets of a set of corpora associated with a corresponding test question. In embodiments described in this document, the test question, labels, rationales, information sources, and datasets all share a common field of interest, or "domain."

In one example, if an oracle in step 203 had been asked to predict which pay-per-view television scheduled to be broadcast on the following day would have the largest audience, the oracle might have referred to an industry Web site that identified how many viewers had purchased viewing rights to a popular pay-for-view sporting event. Based on the natural-language information displayed at that Web site, the oracle might then have returned a label that identified the sporting event as being the most-viewed pay-per-view broadcast of the following day. The oracle might also have returned an identification of the Web site. The one or more processors might then retrieve from the Web site one or more documents identified by the oracle as having relevance to the predictive test question, label, and rationales, and formatting that information into a dataset, and adding that dataset to a corpus of a corpus set that is associated with the oracle and the predictive test question. The processors may create this corpus set during the first performance of step 205, or it may use these newly created datasets to update an existing corpus set that had been previously created by processors of the cognitive system or of the training system.

The one or more processors might then, after a period of time, retrieve from the identified extrinsic information sources another set of time-stamped natural-language datasets from the same Web site, using the label and rationales received in step 203 to select specific information from the subscriber site that has a likelihood of being relevant to the oracle's selections. Each of these new datasets would be an updated version, associated with a later time-stamp, of a dataset originally used by the oracles in step 203.

In our example, an updated dataset might comprise natural-language information that identifies how many viewers had purchased the same pay-per-view sporting event four hours after the time at which the oracles originally retrieved this information from the subscriber.

In step 207, the one or more processors add (or "ingest") the datasets retrieved in step 205 to the sets of corpora that may have been created or updated in step 205. As described above, a set of corpora (or "corpus set") comprises all datasets associated with a particular label, and each corpus of the corpus set comprises all datasets retrieved from a particular subscriber that are associated with the particular label.

In our pay-per-view example, an oracle might thus in step 203 have returned a set of six corpora, each of which comprised datasets retrieved from one of six subscribers that provided evidence to support one or more rationales for the label. A first corpus of that set of six corpora comprised a dataset of natural-language content retrieved by the oracle from the industry Web site in step 203. In step 207, the one or more processors updates the original version of that first corpus into a distinguishable or differentiable version by adding to it a second dataset, retrieved from the same subscriber at a later time.

Each corpus of a corpus set associated with a particular test question and its corresponding label and rationales is thus updated in step 207 in this manner, and each corpus set received from an oracle in step 203 is thus updated by the addition of a new set of datasets retrieved at a later time than those already included within the corpus set.

In step 209, each oracle is asked the same set of predictive test questions that were originally asked in step 203 and, in response, each oracle refers to the same subscriber sources of evidence in order to identify rationales for a selected label. This time, though, the oracles refer to subscriber evidence by referring to the distinguishable or differentiable sets of corpora created in step 207.

Because the oracles may now base their rationales at least in part on information retrieved later in time, the oracles may now select one or more labels that differ from the labels they originally selected in step 203.

For example, in our pay-per-view case, the oracle asked to predict a correct answer to the question about the following day's pay-per-view broadcasts may discover in the distinguishable or differentiable corpus associated with the industry Web site subscriber that sales for the pay-per-view sporting event have abruptly stopped since the time at which the oracle first viewed the subscriber's Web site in step 203. This sudden change of events may result in the oracle finding sufficient rationale to associate this test question with a different label. That different label may, for example, identify a pay-per-view awards ceremony, broadcast on the same day, that has shown a sudden surge in sales.

The one or more processors in step 209 then receive a new set of labels from the oracles, based on the oracles' responses to the second round of supervised scenarios in step 209, during which the test questions are asked a second time.

In step 211, the one or more processors determine, for each distinguishable or differentiable corpus set created in step 207, a relative contribution of each corpus of the distinguishable or differentiable corpus set to an oracle's selection in step 209 of a label that corresponds to that corpus set.

This step may be illustrated by elaborating the ongoing pay-per-view example. If the corpus set associated with the oracle's pay-per-view question comprises six corpora, each of those corpora is associated with one of six subscribers upon which the oracle may base rationales for the labels it selects in response to the pay-per-view question. If the oracle in step 209 then updates the label it originally selected in step 203 to indicate that it now predicts that the awards ceremony, not the sporting event, will garner the most viewers, rationales for that particular revised prediction will have been based on evidence culled from at least one of the six corpora.

If only two of the subscribers provided updated datasets in step 205 that contributed to the revision to the prediction, only the two corpora that contain those two datasets will have contributed to the revision. Furthermore, if information retrieved from a first of those two subscribers (corresponding to a first corpus of the six corpora) was three times as important to the revision as information retrieved from the second of those two subscribers (corresponding to a second corpus of the six corpora), then the first corpus will have contributed 75% of the evidence supporting the revised label and rationales, the second corpus will have contributed 25% of the evidence supporting the revised label and rationales, and the third, fourth, fifth, and sixth corpora will have provided 0%.

In some embodiments, one corpus may provide support for multiple rationales. In some embodiments, one label may be supported by more than one corpus. In some embodiments, some, but not all datasets of a corpus may support a particular rationale or label.

In some embodiments, the one or more processors perform this step only for sets of corpora associated with labels that have been changed from the original values identified in step 203.

This relative contribution of each corpus to a revision to a label may be determined by methods, techniques, and technologies known in the art of natural-language processing, linguistics, or artificial intelligence. The one or more processors may, for example, infer similarities between keywords, meanings, or semantics of the natural-language information included within a corpus or dataset and analogous keywords, meanings, or semantics associated with a selected label or rationale. A method of semantic-frequency analysis may identify or count occurrences of parts of speech, hypernym/hyponym relationships, and other semantic structures that indicate similarity or dissimilarity to a particular rationale. Any other known method may be used, and such a method may be chosen as a function of implementation-dependent constraints or goals.

In some embodiments, relative contributions of each corpus of a set of corpora to a selection of a revised label may be expressed as a percent, where a sum of the relative contributions of all corpora of the set of corpora equals 100%. In other embodiments, relative contributions may be expressed by other quantitative representations, such as by scaled numerals or weighted coefficients.

In some embodiments, a set of relative contributions of each corpus of a corpus set may be represented as a set of "booster factors" that each identify one corpus's relative contribution to the revised rationale, relative to the other corpora included within the corpus set. In some embodiments, a booster factor of a corpus may be as simple as that corpus's actual percent contribution, relative to the contribution of the corpus set as a whole.

In step 213, the one or more processors communicate one or more lag variables to the oracle.

Lag variables identify which of these datasets are most significant, possibly as a function of a degree of change identified by a dataset, or as a function of metadata associated with one or more of the datasets. Lag variables may thus allow an oracle to more accurately predict future outcomes by selectively identifying time-based anomalies within a dataset or a corpus that manifest over a period of time. In this way, values of a lag variable may be interpreted as a measurement or representation of changes in a relevance of a piece of data over a period of time, and may therefore help an oracle to more accurately predict future outcomes by selectively identifying anomalies within a dataset of a corpus that manifest over a period of time.

For example, a lag variable that tracks horse-race attendance over time might indicate that attendance rises considerably just before a particularly celebrated race. These lag variables might then be used to ascribe greater importance to a dataset that identifies attendance figures the last time the celebrated race occurred, in order to more accurately predict attendance the next time that race is run.

A lag variable thus represents a time-varying characteristic of a dataset, of a document included within a dataset, or of an element of knowledge or information included within a document. By identifying changes or a pattern of change in a lag variable over a period of time, an oracle may better determine a relative importance, relevance, value, or worth of a dataset or corpus, relative to other similar components of a corpus set.

In an elaboration of the above horse-racing example, a corpus may comprise 52 datasets that each identify one week of attendance figures, concession sales, operating expenses, and other figures related to an operation of a particular equestrian race track. An oracle may have identified this corpus as a useful source of evidence when selecting a rationale for an answer to a predictive question about expected attendance at that race track over an upcoming August race season.

In this example, the one or more processors may identify a lag variable that identifies changes in a highest single-day attendance of a week. If the previous year's attendance figures are each included within one of 52 datasets, the one or more processors in step 213 may communicate to the oracle values of that lag variable collected over the preceding year. Here, each variable identifies a week-to-week change in the weekly highest single-day attendance parameter. In some embodiments, a lag variable may represent a change in a value of a parameter over a different period of time, such as a day, a year, a season, a morning, or a fiscal year.

In some embodiments, large numbers of lag variables may be communicated to the oracle in step 213. Some datasets may be characterized by more than one lag variable, or by no lag variables at all, and some lag variables may characterize more than one dataset.

In step 215, the oracle uses the values of the lag variables received in step 213 to determine a relative worth of each dataset, and then ranks the datasets by these relative worths.

In some embodiments, the determining a relative worth may be performed as an ad hoc human activity, as a function of humanly perceivable patterns in the values of the lag variables.

In other cases, the determining a relative worth may be automated, where relative worths are computed as a function of one or more values, changes in value, or rates of change of value of one or more lag variables, relationships among such values, changes, and rates of change, or combinations thereof, regardless of whether those values, changes, rates of change, and relationships would be perceivable to a human observer.

In our race-track example, this determining a relative worth may be performed as a function of an attendance-figure lag variable's identification of a surge in attendance figures during the third week of August of the previous year. If the oracle, using its expert knowledge, recognizes that a celebrated race is held at that race track during that week each year, then the information identified by that lag variable would suggest to the oracle that the dataset retrieved for the third week of August has greater worth than other datasets. That is, when reviewing datasets of a set of corpora relevant to the predictive question, the received values of the lag variable may suggest that giving greater weight to the third-week-of-August dataset may allow the oracle to more accurately predict attendance figures when the celebrated race is run again, during the next series of August races.

In some embodiments, this procedure may be automated. The one or more processors may, for example, use known mathematical or statistical procedures, such as a linear-regression analysis, to identify a pattern in the way one or more lag variables change over time that may be a departure from a longer-term trend or a steady-state condition. Detecting such anomalies, such as a sudden, brief surge in a value of a parameter that otherwise consistently falls within a narrow range, may, for example, allow the one or more processors to automatically assign higher relevance to certain datasets that fall within a time range of an occurrence of such an anomaly.

This novel step thus helps the oracle more efficiently and accurately interpret a corpus set to answer a predictive question. In effect, consideration of metadata identified by lag variables allows an oracle to weight individual documents, datasets, or corpora by identifying historic patterns that, through elaboration into the future, may have predictive value.

In this step, the oracle, after having identified a relative worth of each dataset (or each corpus) of the corpus set, may rank the datasets or corpora in order of relative importance or "worth." In some embodiments, this ranking may represent a relative worth to a change in a label between step 203 and step 209, and such a ranking may be a function of identifying an anomalous change in a lag variable that is similar to the change in the label over the same period of time. In other cases, a lag variable that identifies a greater change in a number of documents in a dataset retrieved during a particular period of time may indicate that that dataset has greater relevance to a predictive decision based on evidence gathered over that period of time.

In some embodiments, this ranking may comprise associating each dataset or corpus with a numeric or other quantitative value, and then sorting the datasets or corpora by their associated values. In some embodiments, this ranking may comprise organizing the datasets or corpora into categories, each of which is associated with a level of a sorted, prioritized hierarchy of levels.

In step 217, the one or more processors[[,]] eliminate a subset of the datasets included within the corpus set, as a function of the ranking of step 215. This step may greatly improve an efficiency of the cognitive system's use of the corpus set. In some embodiments, this step may reduce the corpus set to a tiny fraction of its earlier size.

In this step, the oracle, or an automated process, uses the ranking of step 215 to choose which datasets to retain in the corpus set, discarding those that it deems insufficiently likely to be able to support a correct response to a predictive question.

A number of datasets to retain may be set as a function of a size, a storage capacity, or an other hardware or software constraint of a computing platform used by the one or more processors or by the oracle; as a function of each dataset's absolute ranking or organization into a prioritized tier; as a size of a dataset or of some other characteristic of the dataset associated with an amount of a limited resource required to store, maintain, or access information within the dataset; and combinations thereof.

In step 219, the reduced, optimized corpora are ingested into the NLP cognitive system to allow the system to more accurately interpret and answer predictive questions.

At the conclusion of the method of FIG. 2, a set of corpora associated with a predictive test question will have been created, populated, optimized, and communicated to an NLP cognitive system, which will then ingest the corpora into its predictive model.

In some embodiments, the method of FIG. 2 may be performed repeatedly or continuously, each time further training the cognitive system by further optimizing a selection of datasets included within a corpus set by considering new datasets retrieved over additional periods of time.

What is claimed is:

1. A natural language processing training (NLP-training) system comprising a processor, a memory coupled to the processor, and a computer-readable hardware storage device coupled to the processor, the storage device containing program code configured to be run by the processor via the memory to implement a method for forecastable supervised labels and corpus sets for training a natural-language processing system, the method comprising:
the training system selecting an oracle, wherein the oracle is a human expert or a computerized expert system that possesses expertise in a particular field of endeavor;
the training system receiving from the oracle identifications of a first label, a set of extrinsic electronic sources, and a set of rationales,
wherein the first label identifies an answer to a predictive question in the particular field of endeavor, given a set of conditions specified by the predictive question,
wherein each rationale of the set of rationales comprises an identification of at least one source of the set of extrinsic sources, and
wherein each source of the set of extrinsic sources is a source of initial natural-language content upon which the oracle based the selection of the first label;
the training system adding training datasets to a first set of corpora, wherein each training dataset of the training datasets is associated with a subset of natural-language content located at one or more sources of the set of extrinsic sources;
the training system retrieving from the one or more extrinsic sources, at a second time, later versions of the natural-language content;
the training system creating a second set of corpora by inserting into the first set of corpora the later versions of the natural-language content;
the training system communicating the second set of corpora to the oracle;
the training system accepting from the oracle, in response to the communicating, a second label;
the training system deleting at least a first training dataset from the second set of corpora when a degree of relevance of the first training dataset falls below a predetermined threshold,
wherein the degree of relevance of the first training dataset is proportional to a degree to which i) a difference between the initial and the later versions of the subset of natural-language content associated with the first training dataset influences ii) a difference between the first label and the second label; and
the training system training the natural-language processing system by submitting the second set of corpora to a training function of a machine-learning application.

2. The NLP-training system of claim 1,
wherein the oracle selects the second label as being an answer to the predictive question as a function of the later versions of the natural-language content.

3. The NLP-training system of claim 1,
wherein an initial version of a first document, of the first training dataset, is a subset of the initial natural-language content retrieved from a particular source of the one or more extrinsic sources,
wherein the creating the second set of corpora further comprises replacing, in the first training dataset, the initial version of the first document with an updated version of the first document, and
wherein the updated version of the first document is generated by retrieving, from the particular source, an updated version of the subset of natural-language content and then updating the first document with the updated version of the particular natural-language content.

4. The NLP-training system of claim 1,
wherein the degree of relevance of the first training dataset is proportional to a value of a lag variable associated with the first training dataset,
wherein the lag variable measures a pattern of change in a time-varying characteristic of the first training dataset over a period of time.

5. The NLP-training system of claim 4,
wherein the training system deletes the first training dataset from the second set of corpora if a value of the lag variable indicates that the degree of relevance of the first training dataset has fallen below the predetermined threshold at the second time.

6. The NLP-training system of claim 4, wherein the degree of relevance of the first training dataset is further determined by:
the system transmitting to the oracle time-stamped metadata identified by values of the lag variable, wherein the time-stamped metadata identify time-specific values of a characteristic of the first training dataset; and
the system receiving from the oracle, in response to the transmitting, an identification of a degree of contribution of the first training dataset to the oracle's selection of the second label.

7. A method for forecastable supervised labels and corpus sets for training a natural-language processing system, the method comprising:
a natural language processing training (NLP-training) system selecting an oracle, wherein the oracle is a human expert or a computerized expert system that possesses expertise in a particular field of endeavor;
the training system receiving from the oracle identifications of a first label, a set of extrinsic electronic sources, and a set of rationales,
wherein the first label identifies an answer to a predictive question in the particular field of endeavor, given a set of conditions specified by the predictive question,
wherein each rationale of the set of rationales comprises an identification of at least one source of the set of extrinsic sources, and
wherein each source of the set of extrinsic sources is a source of initial natural-language content upon which the oracle based the selection of the first label;
the training system adding training datasets to a first set of corpora, wherein each dataset of the training datasets is associated with a subset of natural-language content located at one or more sources of the set of extrinsic sources;
the training system retrieving from the one or more extrinsic sources, at a second time, later versions of the natural-language content;
the training system creating a second set of corpora by inserting into the first set of corpora the later versions of the natural-language content;
the training system communicating the second set of corpora to the oracle;
the training system accepting from the oracle, in response to the communicating, a second label;
the training system deleting at least a first training dataset from the second set of corpora when a degree of relevance of the first training dataset falls below a threshold,
wherein the degree of relevance of the first training dataset is proportional to a degree to which i) a difference between the initial and the later versions of the subset of natural-language content associated with the first training dataset influences ii) a difference between the first label and the second label; and
the training system training the natural-language processing system by submitting the second set of corpora to a training function of a machine-learning application.

8. The method of claim 7, wherein the oracle selects the second label as being an answer to the predictive question as a function of the later versions of the natural-language content.

9. The method of claim 7,
wherein an initial version of a first document, of the first training dataset, is a subset of the initial natural-language content retrieved from a particular source of the one or more extrinsic sources,
wherein the creating the second set of corpora further comprises replacing, in the first training dataset, the initial version of the first document with an updated version of the first document, and
wherein the updated version of the first document is generated by retrieving, from the particular source, an updated version of the subset of natural-language content and then updating the first document with the updated version of the particular natural-language content.

10. The method of claim 7,
wherein the degree of relevance of the first training dataset is proportional to a value of a lag variable associated with the first training dataset,
wherein the lag variable measures a pattern of change in a time-varying characteristic of the first training dataset over a period of time.

11. The method of claim 10, wherein the training system deletes the first training dataset from the second set of corpora if the value of the lag variable indicates that the degree of relevance of the first training dataset has fallen below the predetermined threshold value at the second time.

12. The method of claim 10, wherein the degree of relevance of the first training dataset is further determined by:
the system transmitting to the oracle time-stamped metadata identified by values of the lag variable, wherein the time-stamped metadata identify time-specific values of a characteristic of the first training dataset; and
the system receiving from the oracle, in response to the transmitting, an identification of a degree of contribution of the first training dataset to the oracle's selection of the second label.

13. The method of claim 7, further comprising providing at least one support service for at least one of creating, integrating, hosting, maintaining, and deploying computer-readable program code in the computer system, wherein the computer-readable program code in combination with the computer system is configured to implement the selecting, the receiving, the adding, the retrieving, the creating, the communicating, the accepting, the deleting, and the training.

14. A computer program product, comprising a computer-readable hardware storage device having computer-readable program code stored therein, the program code configured to be executed by a natural language processing training (NLP-training) system hardware storage device coupled to a processor, the storage device containing program code configured to be run by the processor via a memory to implement a method for forecastable supervised labels and corpus sets for training a natural-language processing system, the method comprising:

the training system selecting an oracle, wherein the oracle is a human expert or a computerized expert system that possesses expertise in a particular field of endeavor;

the training system receiving from the oracle identifications of a first label, a set of extrinsic electronic sources, and a set of rationales, wherein the first label identifies an answer to a predictive question in the particular field of endeavor, given a set of conditions specified by the predictive question, wherein each rationale of the set of rationales comprises an identification of at least one source of the set of extrinsic sources, and wherein each source of the set of extrinsic sources is a source of initial natural-language content upon which the oracle based the selection of the first label;

the training system adding training datasets to a first set of corpora, wherein each dataset of the training datasets is associated with a subset of natural-language content located at one or more sources of the set of extrinsic sources;

the training system retrieving from the one or more extrinsic sources, at a second time, later versions of the natural-language content;

the training system creating a second set of corpora by inserting into the first set of corpora the later versions of the natural-language content;

the training system communicating the second set of corpora to the oracle;

the training system accepting from the oracle, in response to the communicating, a second label;

the training system deleting at least a first training dataset from the second set of corpora when a degree of relevance of the first training dataset falls below a threshold, wherein the degree of relevance of the first training dataset is proportional to a degree to which i) a difference between the initial and the later versions of the subset of natural-language content associated with the first training dataset influences ii) a difference between the first label and the second label; and the training system training the natural-language processing system by submitting the second set of corpora to a training function of a machine-learning application.

15. The computer program product of claim 14, wherein the oracle selects the second label as being an answer to the predictive question as a function of the later versions of the natural-language content.

16. The computer program product of claim 14, wherein an initial version of a first document, of the first training dataset, is a subset of the initial natural-language content retrieved from a particular source of the one or more extrinsic sources, wherein the creating the second set of corpora further comprises replacing, in the first training dataset, the initial version of the first document with an updated version of the first document, and wherein the updated version of the first document is generated by retrieving, from the particular source, an updated version of the subset of natural-language content and then updating the first document with the updated version of the particular natural-language content.

17. The computer program product of claim 14, wherein the degree of relevance of the first training dataset is proportional to a value of a lag variable associated with the first training dataset, wherein the lag variable measures a pattern of change in a time-varying characteristic of the first training dataset over a period of time.

18. The computer program product of claim 17, wherein the training system deletes the first training dataset from the second set of corpora if the value of the lag variable indicates that the degree of relevance of the first training dataset has fallen below the predetermined threshold at the second time.

19. The computer program product of claim 17, wherein the degree of relevance of the first training dataset is further determined by:

the system transmitting to the oracle time-stamped metadata identified by values of the lag variable, wherein the time-stamped metadata identify time-specific values of a characteristic of the first training dataset; and the system receiving from the oracle, in response to the transmitting, an identification of a degree of contribution of the first training dataset to the oracle's selection of the second label.

* * * * *